Oct. 4, 1949.    A. W. SMITH    2,483,788
FISHING FLOAT
Filed April 20, 1948

INVENTOR.
Alvin W. Smith
BY
Oliver B. Kaiser
Atty.

Patented Oct. 4, 1949

2,483,788

UNITED STATES PATENT OFFICE 2,483,788

FISHING FLOAT

Alvin W. Smith, Cincinnati, Ohio; John G. Robinson, administrator of said Alvin W. Smith, deceased, assignor to Emma L. Bauer, Cincinnati, Ohio Application April 20, 1948, Serial No. 22,092

1 Claim. (Cl. 43—49)

This invention relates to improvements in fishing floats to be readily applied upon a fishing line, either firmly clasped thereon as desirable for trolling or still fishing or freely slidable thereon for casting.

An object of the invention is to provide a float of simple and durable construction to adapt it to be readily strung and axially confined upon a fishing line for free slidable movement thereon or for fixedly binding the same thereon without cutting or injury to the line.

Another object is to provide a float with a kerf therein longitudinally with its axis for the reception of a fishing line, the kerf adapted to be sealed at each of the opposite ends of the float respectively at one end by a split ring clip and at its opposite end by a sleeve clip both clip and sleeve rotatively mounted upon the float to accommodate for a quick and secured application of the float upon the line either as freely slidable thereon or firmly bound at any desired position therealong.

Another object is to provide a float with a kerf therein and axially thereof for the reception of a fishing line, the kerf adapted to be sealed at each of the opposite ends of the float respectively by a clip rotatively mounted thereon for a simple, quick and durable application of the float upon the line and freely slidable thereon or for removal therefrom, one of the clips arranged for threading a fold in the line therethrough to loop the same about the clip and thereby firmly securing the float to the line, at any desired point therealong. The looping of the line about the clip provides a float tie connection of a character non-cutting or weakening to the line.

Various other features and advantages of the invention are more fully set forth in and apparent from the following description of a preferred embodiment as illustrated by the drawings accompanied herewith and forming a part of this specification, in which.

Figure 1:
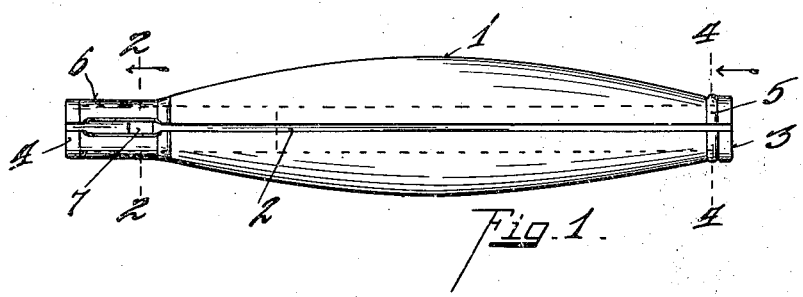
Figure 1 is a side elevation of the improved float having a kerf or slot therein longitudinally thereof, open for making a slip-in insertion of a fishing line.
Figures 2, 3, 5:
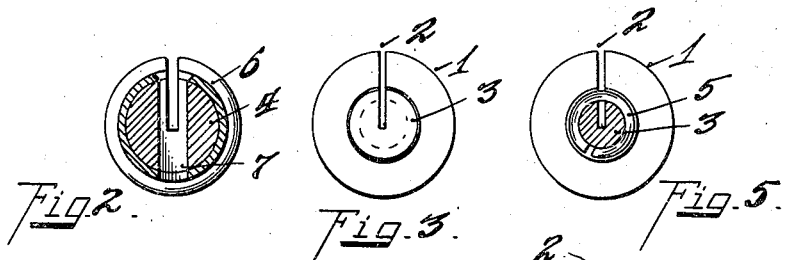
Figure 2 is an enlarged section taken on line 2, 2, Figure 1.
Figure 3 is an end elevation of the float.
Figure 5 is a section similar to Figure 4 showing the clip in sealing position, as rotatively adjusted from the position shown in Figure 4.
Figures 4, 6:
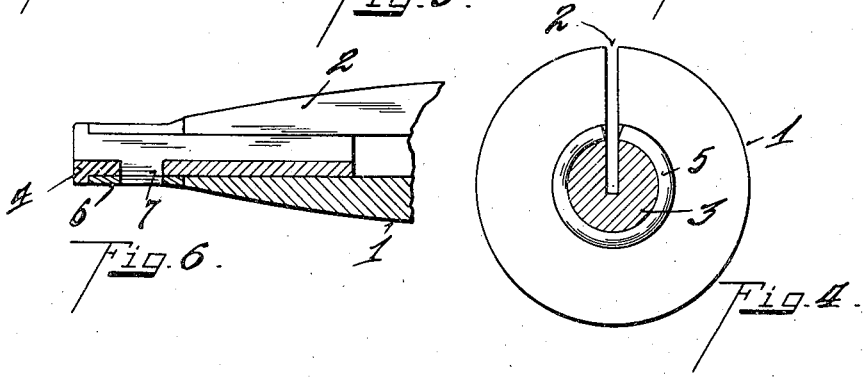
Figure 4 is an enlarged section taken on line 4, 4, Figure 1.
Figure 6 is a central longitudinal section through one end of the float.

Referring to the drawings 1 indicates the body of the float of conventional design and preferably of Balsa wood material as favored for the service contemplated, having a kerf or slot 2 longitudinally therein and coincident with the axis of the body. The body within each of its opposite ends respectively has a headed peg with the shank portion thereof engaged and fixed therein, each having a kerf longitudinally therein and in registry and continuity with the kerf 2 in the body. The pegs preferably are formed of a plastic material having greater durability than the wood material of the body of the float, thereby reinforcing the opposite ends of the body and provide substantial bearing supports for clips rotatively mounted thereon and employed for securing the float at its opposite ends upon a fishing line and by means of the kerf in the body the line is recessed within and extends axially through the body of the float.

The shank of the peg 3 for one end of the float and which may be designated as the tail end extends into and is adhesively secured within a longitudinal axial base through the body of the float and provides a journal support for a clip 5, of split ring form, interposed between the end of the body and headed end of the peg which protrudes from the body to laterally confine the clip upon the body. Upon rotative adjustment of the clip the split therein can be brought either into or out of registry with the kerf 2 in the body and peg, and when in registry allows for a quick and convenient insertion of the fishing line into the kerf and by a slight rotative adjustment of the clip the line is locked within the kerf with a float freely slidable upon the line.

The peg 4 for the opposite end of the body, which for the purpose of identification may be designated as the head end of the float, has its shank protruding or projecting to a greater degree to provide a journal support for a split sleeve or ferrule 6, to interpose the same between the head end of the peg and relative end of the body to confine the sleeve against longitudinal displacement. The split sleeve 6 is comparable to the split ring 5 to function analogous therewith in its rotative adjustment upon the peg to bring the split either into or out of registration with the kerf 2 of the body, and when in registry to permit ready insertion and recessing of the fishing line axially into the body and upon a slight rotation of the clip lock the line within the body for relative slidable movement of the line and float.

The float thus is locked to the line at both its head and tail ends and freely and smoothly slidable upon the line in either of alternate or reverse directions, a feature desirable for casting.

Figure 7:
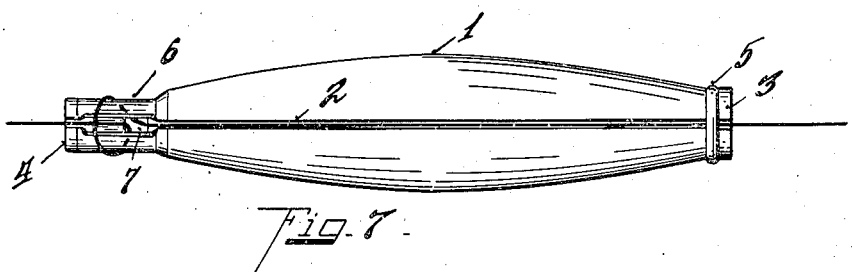
Figure 7 is a plan view similar to Figure 1 illustrating the float applied and firmly clasped to a line.

To firmly secure the float to the line at any point in the line length, the peg 4 and sleeve 6 are transversely apertured to provide an opening 7 therethrough when the split of the sleeve clip is in registry with the body kerf. Upon folding a portion of the line to form a loop, the loop is threaded through the opening 7 and thence lapped about the clip to exteriorly encircle the same, as shown in Figure 7, and upon drawing the line taut, the float is firmly bound to the line. The width of the slit of the clip between its beaded rim ends is slightly in excess of that at the rims to allow for more convenient access in threading the loop in the line transversely through the head end of the float, the variation accommodating upon a slightly rotative adjustment of the clip to span the same across the kerf, sealing the line within the kerf at opposite sides of its lap about the exterior of the clip and which confines the line to extend longitudinally from the opposite ends of the float.

The construction of the float provides for a quick and non-complicated application upon and removal from the line and either slidably or fixedly thereupon, for different fishing service and in a fixed condition without possible injury to the line which would result in its breakage. The clips being preferably of plastic material stabilize the ends of the body of the float, protecting the body against splitting or breakage when striking an obstruction in casting the line, thereby increasing the life of the float.

It is obvious and optional that the sleeve type of clip can be duplicated for each of the opposite ends of the float, which permits looping the line exteriorly about either or both ends of the float.

Having described my invention, I claim:

A float of the nature disclosed, comprising: an elongated body having a kerf extending longitudinally thereof, the body at each of its opposite ends having a headed peg centrally, fixedly socketed therein, the pegs being formed of a moldable material to give greater durability to the ends of the float and providing journal supports, each peg having a kerf extending longitudinally therein in registry with and for continuity of the body kerf, and split ring clips each mounted upon and laterally confined upon one of said pegs, rotative thereon to bring the slit of the clip into and out of registry with the kerf in the peg for applying and sustaining the float upon a fishing line and for its removal therefrom, one of said clips and its peg support each having an aperture therethrough for threading a loop in the line therethrough and to circumferentially encircle the same about the clip for binding the float to the line.

ALVIN W. SMITH.

REFERENCES CITED

The following references are of record in the file of this patent:

UNITED STATES PATENTS

| Number | Name | Date |
|---|---|---|
| 326,134 | McNeal | Sept. 15, 1885 |
| 2,220,358 | Storey | Nov. 5, 1940 |
| 2,293,294 | Heckman | Aug. 18, 1942 |
| 2,385,415 | Jackson | Sept. 25, 1945 |